(12) United States Patent
Pickelsimer et al.

(10) Patent No.: US 8,806,532 B2
(45) Date of Patent: Aug. 12, 2014

(54) PROVIDING A USER INTERFACE

(75) Inventors: Lisa A. Pickelsimer, Atlanta, GA (US);
Joshua Musick, Brooklyn, NY (US);
Robert Fabricant, Brooklyn, NY (US);
David Werner, San Francisco, CA (US)

(73) Assignee: Cox Communications, Inc., Atlanta, GA (US)

( * ) Notice: Subject to any disclaimer, the term of this patent is extended or adjusted under 35 U.S.C. 154(b) by 1091 days.

(21) Appl. No.: 12/126,126

(22) Filed: May 23, 2008

(65) Prior Publication Data

US 2009/0055743 A1 Feb. 26, 2009

Related U.S. Application Data

(63) Continuation-in-part of application No. 11/787,732, filed on Apr. 17, 2007.

(60) Provisional application No. 60/881,888, filed on Jan. 23, 2007, provisional application No. 60/897,341, filed on Jan. 25, 2007, provisional application No. 60/946,790, filed on Jun. 28, 2007, provisional application No. 60/931,698, filed on May 25, 2007.

(51) Int. Cl.
*H04N 21/47* (2011.01)
*H04N 21/488* (2011.01)

(52) U.S. Cl.
USPC .................................. 725/43; 725/44; 725/52

(58) Field of Classification Search
USPC ...................... 725/37–61; 715/716–726, 768, 715/788–801, 808
See application file for complete search history.

(56) References Cited

U.S. PATENT DOCUMENTS

| 5,565,909 | A | 10/1996 | Thibadeau et al. |
| 5,583,560 | A | 12/1996 | Florin et al. |
| 5,808,662 | A | 9/1998 | Kinney et al. |
| 5,812,123 | A | 9/1998 | Rowe et al. |
| 5,818,439 | A | 10/1998 | Nagasaka et al. |
| 5,861,906 | A | 1/1999 | Dunn et al. |

(Continued)

FOREIGN PATENT DOCUMENTS

JP 2002-218428 8/2002

OTHER PUBLICATIONS

U.S. Office Action dated Apr. 26, 2011 cited in U.S. Appl. No. 12/126,096.

(Continued)

*Primary Examiner* — Jason J Chung
*Assistant Examiner* — Carmine Malangone
(74) *Attorney, Agent, or Firm* — Merchant & Gould P.C.

(57) ABSTRACT

A user interface may be provided. First, a first input may be received, and in response to the received first input, at least a portion of a plurality of content elements may be displayed. Then, a second input indicating a selection of a one of the displayed plurality of content elements may be received. In response to the received second input, a displayed full version of a programming content and the displayed plurality of content elements may be removed. Also, in response to the received second input, a shrunken version of the full version of the programming content and a more detailed version of the selected one of the plurality of content elements may be displayed. Next, in response to a received third input, the more detailed version and the displayed shrunken version may be removed and the full version of the programming content may be redisplayed.

20 Claims, 8 Drawing Sheets

(56) References Cited

U.S. PATENT DOCUMENTS

| | | | |
|---|---|---|---|
| 6,144,375 A | 11/2000 | Jain et al. | |
| 6,188,398 B1 | 2/2001 | Collins-Rector et al. | |
| 6,282,713 B1 | 8/2001 | Kitsukawa et al. | |
| 6,438,579 B1 | 8/2002 | Hosken | |
| 6,615,248 B1 | 9/2003 | Smith | 709/217 |
| 6,754,904 B1 | 6/2004 | Cooper et al. | |
| 6,934,963 B1 | 8/2005 | Reynolds et al. | 725/39 |
| 6,968,364 B1 | 11/2005 | Wong et al. | |
| 6,983,426 B1 | 1/2006 | Kobayashi et al. | |
| 7,017,173 B1 * | 3/2006 | Armstrong et al. | 725/87 |
| 7,080,139 B1 | 7/2006 | Briggs et al. | |
| 7,228,305 B1 | 6/2007 | Eyal et al. | |
| 7,246,367 B2 | 7/2007 | Livonen | |
| 7,249,366 B1 | 7/2007 | Flavin | |
| 7,272,844 B1 | 9/2007 | Bankers et al. | |
| 7,290,211 B2 | 10/2007 | Goodwin et al. | |
| 7,363,644 B2 | 4/2008 | Wugofski | |
| 7,584,214 B2 | 9/2009 | Narahara et al. | 707/104.1 |
| 7,596,761 B2 | 9/2009 | Lemay et al. | 715/779 |
| 7,669,219 B2 | 2/2010 | Scott, III | |
| 7,673,315 B1 | 3/2010 | Wong et al. | |
| 7,685,204 B2 | 3/2010 | Rogers | |
| 7,698,263 B2 | 4/2010 | Pickelsimer et al. | |
| 7,716,376 B1 | 5/2010 | Price et al. | |
| 7,877,293 B2 | 1/2011 | Biebesheimer et al. | |
| 7,886,327 B2 | 2/2011 | Stevens | |
| 7,895,625 B1 | 2/2011 | Bryan et al. | |
| 7,904,924 B1 | 3/2011 | de Heer et al. | |
| 7,933,789 B2 | 4/2011 | Boland et al. | |
| 7,992,163 B1 | 8/2011 | Jerding et al. | |
| 8,090,606 B2 | 1/2012 | Svendsen | |
| 8,091,032 B2 | 1/2012 | Fischer | |
| 8,220,021 B1 | 7/2012 | Look et al. | |
| 8,364,013 B2 | 1/2013 | Nijim | |
| 8,418,204 B2 | 4/2013 | Pickelsimer et al. | |
| 2001/0001160 A1 | 5/2001 | Shoff et al. | |
| 2001/0037367 A1 | 11/2001 | Iyer | |
| 2002/0007485 A1 | 1/2002 | Rodriguez et al. | |
| 2002/0056123 A1 | 5/2002 | Liwerant et al. | |
| 2002/0057297 A1 | 5/2002 | Grimes et al. | |
| 2002/0069218 A1 | 6/2002 | Sull et al. | |
| 2002/0087982 A1 | 7/2002 | Stuart | 725/539 |
| 2002/0120757 A1 | 8/2002 | Sutherland et al. | |
| 2002/0124252 A1 | 9/2002 | Schaefer et al. | |
| 2002/0128831 A1 | 9/2002 | Ju et al. | |
| 2002/0144273 A1 | 10/2002 | Reto | |
| 2002/0156852 A1 | 10/2002 | Hughes et al. | |
| 2002/0174430 A1 | 11/2002 | Ellis et al. | |
| 2002/0194195 A1 | 12/2002 | Fenton et al. | 707/104.1 |
| 2002/0199188 A1 | 12/2002 | Sie et al. | |
| 2003/0002849 A1 | 1/2003 | Lord | |
| 2003/0021582 A1 | 1/2003 | Sawada | |
| 2003/0084449 A1 * | 5/2003 | Chane et al. | 725/46 |
| 2003/0093790 A1 | 5/2003 | Logan et al. | |
| 2003/0093806 A1 | 5/2003 | Dureau et al. | |
| 2003/0112467 A1 | 6/2003 | McCollum et al. | |
| 2003/0115592 A1 | 6/2003 | Johnson | |
| 2003/0154477 A1 | 8/2003 | Hassell et al. | |
| 2003/0156827 A1 | 8/2003 | Janevski | |
| 2003/0177497 A1 | 9/2003 | Macrae et al. | |
| 2003/0206710 A1 | 11/2003 | Ferman et al. | |
| 2003/0208763 A1 | 11/2003 | McElhatten et al. | |
| 2003/0220100 A1 | 11/2003 | McElhatten et al. | |
| 2003/0225846 A1 | 12/2003 | Heikes et al. | |
| 2003/0229900 A1 | 12/2003 | Reisman | |
| 2004/0034867 A1 | 2/2004 | Rashkovskiy et al. | 725/40 |
| 2004/0060063 A1 | 3/2004 | Russ et al. | |
| 2004/0064835 A1 * | 4/2004 | Bellwood et al. | 725/87 |
| 2004/0078807 A1 | 4/2004 | Fries et al. | |
| 2004/0078814 A1 * | 4/2004 | Allen | 725/47 |
| 2004/0103167 A1 | 5/2004 | Grooters et al. | |
| 2004/0117786 A1 | 6/2004 | Kellerman et al. | |
| 2004/0210928 A1 | 10/2004 | Hamzy et al. | |
| 2004/0255336 A1 | 12/2004 | Logan et al. | 725/135 |
| 2004/0255340 A1 | 12/2004 | Logan | |
| 2004/0268386 A1 | 12/2004 | Logan et al. | |
| 2005/0022241 A1 | 1/2005 | Griggs | |
| 2005/0028208 A1 | 2/2005 | Ellis et al. | |
| 2005/0044565 A1 | 2/2005 | Jerding et al. | |
| 2005/0055710 A1 | 3/2005 | Aoki et al. | |
| 2005/0076363 A1 | 4/2005 | Dukes et al. | |
| 2005/0091316 A1 | 4/2005 | Ponce et al. | |
| 2005/0149880 A1 | 7/2005 | Postrel | |
| 2005/0210145 A1 | 9/2005 | Kim et al. | |
| 2005/0246739 A1 | 11/2005 | Davidson | |
| 2005/0251820 A1 | 11/2005 | Stefanik et al. | |
| 2005/0262542 A1 | 11/2005 | DeWeese et al. | |
| 2005/0278443 A1 | 12/2005 | Winner et al. | |
| 2005/0278740 A1 * | 12/2005 | Helms | 725/41 |
| 2005/0278761 A1 | 12/2005 | Gonder et al. | |
| 2005/0283813 A1 | 12/2005 | Jamail et al. | |
| 2006/0005207 A1 * | 1/2006 | Louch et al. | 719/328 |
| 2006/0020904 A1 | 1/2006 | Aaltonen et al. | |
| 2006/0031882 A1 | 2/2006 | Swix et al. | |
| 2006/0041927 A1 | 2/2006 | Stark et al. | 725/139 |
| 2006/0059514 A1 | 3/2006 | Hsiao et al. | |
| 2006/0059526 A1 | 3/2006 | Poslinski | |
| 2006/0075019 A1 | 4/2006 | Donovan et al. | |
| 2006/0080408 A1 | 4/2006 | Istvan et al. | 709/219 |
| 2006/0090183 A1 | 4/2006 | Zito et al. | |
| 2006/0112325 A1 | 5/2006 | Ducheneaut et al. | |
| 2006/0130093 A1 | 6/2006 | Feng et al. | 725/39 |
| 2006/0143236 A1 | 6/2006 | Wu | |
| 2006/0161950 A1 | 7/2006 | Imai et al. | |
| 2006/0174277 A1 | 8/2006 | Sezan et al. | |
| 2006/0184972 A1 | 8/2006 | Rafey et al. | |
| 2006/0190966 A1 | 8/2006 | McKissick et al. | |
| 2006/0195479 A1 | 8/2006 | Spiegelman et al. | |
| 2006/0248557 A1 | 11/2006 | Stark et al. | 725/37 |
| 2006/0253874 A1 | 11/2006 | Stark et al. | 725/62 |
| 2006/0259926 A1 | 11/2006 | Scheelke et al. | |
| 2006/0271959 A1 | 11/2006 | Jacoby et al. | |
| 2006/0282856 A1 | 12/2006 | Errico et al. | |
| 2007/0033533 A1 | 2/2007 | Sull | |
| 2007/0061835 A1 | 3/2007 | Klein et al. | |
| 2007/0106627 A1 | 5/2007 | Srivastava et al. | |
| 2007/0123353 A1 | 5/2007 | Smith | |
| 2007/0124795 A1 | 5/2007 | McKissick et al. | |
| 2007/0150918 A1 | 6/2007 | Carpenter et al. | |
| 2007/0186180 A1 | 8/2007 | Morgan | |
| 2007/0186231 A1 | 8/2007 | Haeuser et al. | |
| 2007/0186243 A1 | 8/2007 | Pettit et al. | |
| 2007/0198532 A1 | 8/2007 | Krikorian et al. | |
| 2007/0214473 A1 | 9/2007 | Barton et al. | |
| 2007/0220566 A1 | 9/2007 | Ahmad-Taylor | |
| 2007/0245367 A1 | 10/2007 | Ogawa | |
| 2007/0256103 A1 | 11/2007 | Knudson | |
| 2007/0271338 A1 | 11/2007 | Anschutz | |
| 2007/0277205 A1 | 11/2007 | Grannan | |
| 2007/0282949 A1 | 12/2007 | Fischer et al. | |
| 2007/0294726 A1 | 12/2007 | Drazin | |
| 2007/0298401 A1 | 12/2007 | Mohanty et al. | |
| 2008/0010153 A1 | 1/2008 | Pugh-O'Connor et al. | |
| 2008/0022320 A1 | 1/2008 | Ver Steeg | |
| 2008/0036917 A1 | 2/2008 | Pascarella et al. | |
| 2008/0040370 A1 | 2/2008 | Bosworth et al. | |
| 2008/0052371 A1 | 2/2008 | Partovi et al. | |
| 2008/0065758 A1 | 3/2008 | Narayanaswami | |
| 2008/0066111 A1 * | 3/2008 | Ellis et al. | 725/57 |
| 2008/0066114 A1 | 3/2008 | Carlson et al. | |
| 2008/0082606 A1 | 4/2008 | Gupta et al. | |
| 2008/0086456 A1 | 4/2008 | Rasanen et al. | |
| 2008/0092168 A1 | 4/2008 | Logan et al. | |
| 2008/0098323 A1 | 4/2008 | Vallone et al. | |
| 2008/0114861 A1 | 5/2008 | Gildred | |
| 2008/0126936 A1 | 5/2008 | Williams | 715/17 |
| 2008/0155650 A1 | 6/2008 | Klappert et al. | 725/44 |
| 2008/0163307 A1 | 7/2008 | Coburn et al. | 725/61 |
| 2008/0168506 A1 | 7/2008 | Pickelsimer | |
| 2008/0168515 A1 | 7/2008 | Benson et al. | |
| 2008/0177727 A1 | 7/2008 | Pickelsimer | |
| 2008/0178218 A1 | 7/2008 | Pickelsimer | |
| 2008/0235733 A1 | 9/2008 | Heie et al. | |
| 2008/0247730 A1 | 10/2008 | Barton et al. | |

(56) References Cited

U.S. PATENT DOCUMENTS

| | | |
|---|---|---|
| 2008/0263595 A1 | 10/2008 | Sumiyoshi et al. ............. 725/39 |
| 2008/0276278 A1 | 11/2008 | Krieger et al. ................. 725/40 |
| 2008/0288596 A1 | 11/2008 | Smith et al. |
| 2008/0313541 A1 | 12/2008 | Shafton et al. |
| 2008/0320139 A1 | 12/2008 | Fukuda et al. |
| 2009/0019374 A1 | 1/2009 | Logan et al. |
| 2009/0049098 A1 | 2/2009 | Pickelsimer et al. |
| 2009/0049118 A1 | 2/2009 | Stevens |
| 2009/0049473 A1 | 2/2009 | Pickelsimer et al. |
| 2009/0055868 A1 | 2/2009 | Wehmeyer et al. |
| 2009/0063994 A1 | 3/2009 | Pickelsimer et al. |
| 2009/0094643 A1 | 4/2009 | Pickelsimer et al. |
| 2009/0100469 A1 | 4/2009 | Conradt et al. |
| 2009/0125843 A1 | 5/2009 | Billmaier et al. |
| 2009/0172127 A1 | 7/2009 | Srikanth et al. |
| 2009/0172543 A1 | 7/2009 | Cronin et al. |
| 2009/0178081 A1 | 7/2009 | Goldenberg et al. |
| 2009/0199242 A1 | 8/2009 | Johnson et al. |
| 2009/0307719 A1 | 12/2009 | Clark et al. |
| 2009/0310933 A1 | 12/2009 | Lee |
| 2009/0313664 A1 | 12/2009 | Patil et al. |
| 2010/0042746 A1 | 2/2010 | Keum et al. |
| 2010/0064320 A1 | 3/2010 | Angiolillo et al. |
| 2010/0107194 A1 | 4/2010 | McKissick et al. |
| 2010/0175084 A1 | 7/2010 | Ellis et al. |
| 2010/0192173 A1 | 7/2010 | Mizuki et al. |
| 2011/0010744 A1 | 1/2011 | Stecyk et al. |
| 2011/0013885 A1 | 1/2011 | Wong et al. |
| 2011/0072455 A1 | 3/2011 | Pickelsimer et al. |
| 2011/0090402 A1 | 4/2011 | Huntington et al. |
| 2011/0107389 A1 | 5/2011 | Chakarapani |
| 2011/0131600 A1 | 6/2011 | Howcroft et al. |
| 2011/0138423 A1 | 6/2011 | Pickelsimer et al. |
| 2011/0202945 A1 | 8/2011 | Pickelsimer et al. |
| 2011/0283313 A1 | 11/2011 | Gathen et al. |
| 2012/0051717 A1 | 3/2012 | Nijim |
| 2012/0054808 A1 | 3/2012 | Nijim |
| 2012/0054810 A1 | 3/2012 | Nijim |
| 2012/0222056 A1 | 8/2012 | Donoghue et al. |
| 2012/0284744 A1 | 11/2012 | Kumar |
| 2013/0167168 A1 | 6/2013 | Ellis et al. |

OTHER PUBLICATIONS

Copending U.S. Appl. No. 12/868,801, filed Aug. 26, 2010 entitled "Content Library".

Copending U.S. Appl. No. 12/868,824, filed Aug. 26, 2010 entitled "Playlist Bookmarking".

Copending U.S. Appl. No. 12/868,838, filed Aug. 26, 2010 entitled "Content Bookmarking".

U.S. Office Action dated Sep. 14, 2010 cited in U.S. Appl. No. 11/651,140.

U.S. Office Action dated Sep. 14, 2010 cited in U.S. Appl. No. 11/787,732.

U.S. Office Action dated Apr. 28, 2009 cited in U.S. Appl. No. 11/787,733.

U.S. Office Action dated Dec. 28, 2011 cited in U.S. Appl. No. 12/545,099, 13 pgs.

U.S. Office Action dated Jan. 5, 2012 cited in U.S. Appl. No. 12/126,096, 20 pgs.

U.S. Appl. No. 11/651,140, filed Jan. 9, 2007 entitled "Providing User Communication".

U.S. Appl. No. 11/787,732, filed Apr. 17, 2007 entitled "Providing a Video User Interface".

U.S. Appl. No. 11/787,733, filed Apr. 17, 2007 entitled "Providing a Lateral Search".

J. Bouwen et al., "Communication Meets Entertainment: Community Television," Technology White Paper, Alcatel Telecommunications Review, 1st Quarter 2005, pp. 1-8, http://www.alcatel.com/doctypes/articlepaperlibrary/pdf/ATR2005Q1/T0503-Community_TV-EN.pdf.

U.S. Office Action dated Jun. 7, 2011 cited in U.S. Appl. No. 11/651,140.

U.S. Final Office Action dated Jun. 13, 2011 cited in U.S. Appl. No. 12/126,060.

U.S. Final Office Action dated Jun. 21, 2011 cited in U.S. Appl. No. 12/126,025.

U.S. Office Action dated Jun. 22, 2009 cited in U.S. Appl. No. 11/787,732.

U.S. Office Action dated Sep. 30, 2010 cited in U.S. Appl. No. 12/126,165.

U.S. Office Action dated Oct. 5, 2010 cited in U.S. Appl. No. 12/126,096.

U.S. Appl. No. 12/126,025, filed May 23, 2008 entitled "Providing a Video User Interface".

U.S. Appl. No. 12/126,060, filed May 23, 2008 entitled "Providing a Social Network".

Copending U.S. Appl. No. 12/545,099, filed Aug. 21, 2009 entitled "Providing a Video User Interface".

U.S. Final Office Action dated Dec. 22, 2010 cited in U.S. Appl. No. 11/651,140.

U.S. Final Office Action dated Dec. 30, 2009 cited in U.S. Appl. No. 11/787,732.

U.S. Office Action dated Jan. 18, 2012 cited in U.S. Appl. No. 12/126,025, 27 pgs.

U.S. Office Action dated Jan. 19, 2012 cited in U.S. Appl. No. 12/126,165, 20 pgs.

U.S. Office Action dated Jan. 19, 2012 cited in U.S. Appl. No. 11/651,140, 21 pgs.

U.S. Office Action dated Feb. 14, 2011 cited in U.S. Appl. No. 12/126,025.

U.S. Office Action dated Feb. 17, 2011 cited in U.S. Appl. No. 12/126,060.

U.S. Office Action dated Feb. 18, 2011 cited in U.S. Appl. No. 12/545,099.

U.S. Office Action dated Feb. 28, 2011 cited in U.S. Appl. No. 11/651,140.

U.S. Final Office Action dated Mar. 2, 2011 cited in U.S. Appl. No. 11/787,732.

U.S. Final Office Action dated Mar. 2, 2011 cited in U.S. Appl. No. 12/126,165.

U.S. Final Office Action dated Aug. 5, 2011 cited in U.S. Appl. No. 12/545,099.

U.S. Final Office Action dated Sep. 27, 2011 cited in U.S. Appl. No. 11/651,140.

U.S. Office Action dated Mar. 26, 2012 cited in U.S. Appl. No. 12/126,060, 26 pgs.

U.S. Appl. No. 13/221,151, filed Aug. 30, 2011 entitled "Sharing Digitally Recorded Content".

U.S. Final Office Action dated Sep. 29, 2011 cited in U.S. Appl. No. 12/126,096.

Copending U.S. Appl. No. 12/959,731, filed Dec. 3, 2010 entitled "Providing a Media Guide Including Parental Information".

Copending U.S. Appl. No. 12/959,665, filed Dec. 3, 2010 entitled "Content Recommendations".

Copending U.S. Appl. No. 12/959,793, filed Dec. 3, 2010 entitled "Personalizing TV Content".

U.S. Final Office Action dated Jan. 14, 2011 cited in U.S. Appl. No. 12/126,096.

U.S. Final Office Action dated Aug. 15, 2012 cited in U.S. Appl. No. 12/126,025, 33 pgs.

U.S. Final Office Action dated Aug. 23, 2012 cited in U.S. Appl. No. 12/126,060, 30 pgs.

U.S. Final Office Action dated Aug. 29, 2012 cited in U.S. Appl. No. 12/868,838, 7 pgs.

U.S. Final Office Action dated Apr. 20, 2012 cited in U.S. Appl. No. 12/126,096, 25 pgs.

U.S. Final Office Action dated Apr. 25, 2012 cited in U.S. Appl. No. 12/545,099, 16 pgs.

U.S. Final Office Action dated Apr. 25, 2012 cited in U.S. Appl. No. 11/651,140, 21 pgs.

U.S. Office Action dated May 21, 2012 cited in U.S. Appl. No. 12/868,838, 22 pgs.

U.S. Final Office Action dated May 31, 2012 cited in U.S. Appl. No. 12/126,165, 23 pgs.

(56) References Cited

OTHER PUBLICATIONS

U.S. Office Action dated Jun. 20, 2012 cited in U.S. Appl. No. 12/959,731, 30 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Nov. 29, 2012 cited in U.S. Appl. No. 12/868,824, 33 pgs.
U.S. Office Action dated Dec. 19, 2012 cited in U.S. Appl. No. 12/126,025, 30 pgs.
U.S. Final Office Action dated Feb. 26, 2013 cited in U.S. Appl. No. 11/651,140, 21 pgs.
U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Final Office Action dated Apr. 10, 2013 cited in U.S. Appl. No. 12/959,793, 23 pgs. (60136.0215usu1).
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 25, 2013 cited in U.S. Appl. No. 12/126,165, 26 pgs.
U.S. Final Office Action dated Apr. 30, 2013 cited in U.S. Appl. No. 12/868,801, 13 pgs.
U.S. Final Office Action dated May 3, 2013 cited in U.S. Appl. No. 12/545,099, 20 pgs.
U.S. Office Action dated May 14, 2013 cited in U.S. Appl. No. 12/868,824, 12 pgs.
U.S. Office Action dated Sep. 13, 2012 cited in U.S. Appl. No. 11/651,140, 23 pgs.
U.S. Office Action dated Oct. 4, 2012 cited in U.S. Appl. No. 12/868,801, 27 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 16, 2013 cited in U.S. Appl. No. 12/868,801, 13 pgs.
U.S. Office Action dated May 22, 2013 cited in U.S. Appl. No. 11/651,140, 20 pgs.
U.S. Office Action dated Oct. 4, 2013 cited in U.S. Appl. No. 12/126,165, 28 pgs.
U.S. Office Action dated Oct. 7, 2013 cited in U.S. Appl. No. 12/959,793, 27 pgs.
U.S. Final Office Action dated Oct. 28, 2013 cited in U.S. Appl. No. 11/651,140, 19 pgs.
U.S. Office Action dated Oct. 29, 2013 cited in U.S. Appl. No. 12/126,060, 27 pgs.
U.S. Final Office Action dated Nov. 1, 2013 cited in U.S. Appl. No. 12/868,824, 15 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Office Action dated Aug. 21, 2013 in U.S. Appl. No. 12/126,096, 23 pgs.
U.S. Office Action dated Sep. 9, 2013 in U.S. Appl. No. 13/221,151, 16 pgs.
U.S. Appl. No. 12/126,096, filed May 23, 2008 entitled "Providing a Content Mark".
U.S. Appl. No. 12/126,165, filed May 23, 2008 entitled "Providing a Customized User Interface".
U.S. Office Action dated Mar. 6, 2014 in U.S. Appl. No. 12/959,731, 16 pgs.
U.S. Office Action dated Mar. 18, 2014 in U.S. Appl. No. 11/651,140, 18 pgs.
U.S. Office Action dated Mar. 21, 2014 in U.S. Appl. No. 12/868,824, 12 pgs.
U.S. Final Office Action dated Apr. 3, 2014 in U.S. Appl. No. 12/126,060, 18 pgs.
U.S. Office Action dated May 20, 2014 in U.S. Appl. No. 12/126,096, 19 pgs.
U.S. Office Action dated May 21, 2014 in U.S. Appl. No. 13/221,151, 18 pgs.

* cited by examiner

PROVIDING A USER INTERFACE

RELATED APPLICATIONS

Under provisions of 35 U.S.C. §119(e), Applicants claim the benefit of U.S. Provisional Application No. 60/946,790, filed Jun. 28, 2007, and U.S. Provisional Application No. 60/931,698, filed May 25, 2007, both of which are hereby incorporated by reference.

This application is a continuation-in-part (CIP) of U.S. application Ser. No. 11/787,732, filed Apr. 17, 2007, which is incorporated herein by reference. U.S. application Ser. No. 11/787,732, filed Apr. 17, 2007, claimed the benefit of U.S. Provisional Application No. 60/881,888, filed Jan. 23, 2007, and U.S. Provisional Application No. 60/897,341, filed Jan. 25, 2007, under provisions of 35 U.S.C. §119(e).

Related U.S. application Ser. No. 11/651,140, filed on Jan. 9, 2007, and U.S. application Ser. No. 11/787,733, filed on Apr. 17, 2007 are hereby incorporated by reference.

Related U.S. application Ser. No. 12/126,025, entitled "PROVIDING A VIDEO USER INTERFACE" (60136.0036USI1), U.S. application Ser. No. 12/126,060, entitled "PROVIDING A SOCIAL NETWORK" (60136.0036USI2), U.S. application Ser. No. 12/126,096, entitled "PROVIDING A CONTENT MARK" (60136.0036USI3), and U.S. application Ser. No. 12/126,165, entitled "PROVIDING A CUSTOMIZED USER INTERFACE" (60136.0036USI5), filed on even date herewith in the name of Lisa A. Pickelsimer et al., assigned to the assignee of the present application, are also hereby incorporated by reference.

BACKGROUND

Service providers may deliver content to a user over a content delivery system. For example, conventional content delivery systems distribute the content to a first user and a second user independently. In other words, the first user may watch a sports program while the second user may simultaneously watch a video-on-demand program. Furthermore, service providers may provide along with the content, a grid-like guide showing what content is available at what time. Independent content use, however, does not create a socialized entertainment sense with the users. In addition, the grid-like guide provides very little interactive functionality. Consequently, the first user may be socially detached and isolated from the second user and the service provider. Stated another way, the conventional content delivery system may present an impersonal and unsocial user experience.

SUMMARY OF THE INVENTION

A user interface may be provided. First, a first input may be received, and in response to the received first input, at least a portion of a plurality of content elements may be displayed. Then, a second input indicating a selection of a one of the displayed plurality of content elements may be received. In response to the received second input, a displayed full version of a programming content and the displayed plurality of content elements may be removed. Also in response to the received second input, a shrunken version of the full version of the programming content and a more detailed version of the selected one of the plurality of content elements may be displayed. Next, in response to a received third input, the more detailed version and the displayed shrunken version may be removed and the full version of the programming content may be redisplayed.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system. In conventional systems, service providers may provide along with the content, a grid-like guide showing what content is available at what time. The conventional grid-like guide, however, provides very little interactive functionality. Consequently, a user may be socially detached and isolated from other users, the service provider, or the service being provided. Consistent with embodiments of the invention, a user interface may be provided. First, a first input may be received, and in response to the received first input, at least a portion of a plurality of content elements may be displayed. Then, a second input indicating a selection of a one of the displayed plurality of content elements may be received. In response to the received second input, a displayed full version of a programming content and the displayed plurality of content elements may be removed. Also in response to the received second input, a shrunken version of the full version of the programming content and a more detailed version of the selected one of the plurality of content elements may be displayed. Next, in response to a received third input, the more detailed version and the displayed shrunken version may be removed and the full version of the programming content may be redisplayed. Consequently, by using the user interface, the user may be socially engaged with the service provider and the services being provided.

Figure 1:
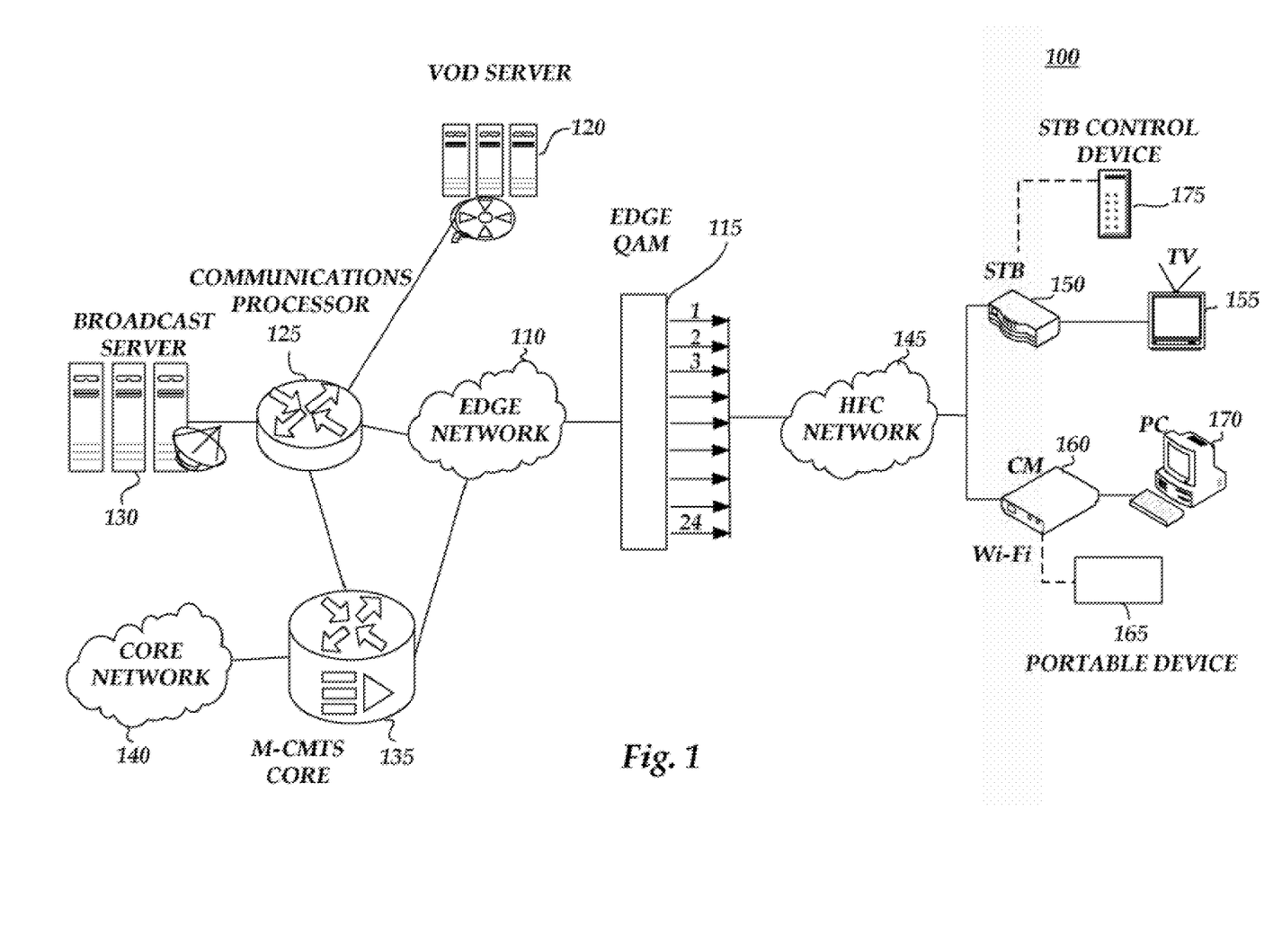
FIG. 1 is a block diagram of an operating environment including an application server.

FIG. 1 is a block diagram of a content delivery system 100. All or a portion of system 100 may be operated by a system operator. The system operator may comprise, but is not limited to, service provider such as a cable television service provider, for example. Consistent with embodiments of the present invention, system 100 may comprise an edge network 110, an edge quadrature amplitude modulation (QAM) device 115, a video-on-demand (VOD) server 120, a communications processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution including, for example, using switched digital technology for broadcast video delivery to digital set-tops. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television, a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150. For example, STB control device 175 may be a remote control for using STB 150. STB control device 175, after proper programming, may interface with STB 150.

Furthermore, system 100 maybe configured to utilize Open Cable Applications Platform (OCAP.) OCAP was developed by Cable Television Laboratories, Inc. of Louisville, Colo. 80027-9750, as a common interactive TV platform. OCAP is a specification for a middleware software layer that enables application developers, interactive television services, and various other products to run interactive applications on content delivery system such as television systems.

Embodiments consistent with the invention may comprise a system for providing a user interface. The system may comprise a memory storage and a processing unit coupled to the memory storage. The processing unit may be operative to display a full version of a programming content and to receive a first input. In addition, the processing unit may be operative to display, in response to the received first input, at least a portion of a plurality of content elements. The displayed plurality of content elements may be overlaid onto the full version of the programming content. The displayed plurality of content elements may be displayed in a lower one-half of a display device. None of the displayed plurality of content elements may abut an edged of the display device. The at least a portion of the plurality of content elements may be displayed in a side-by-side manner. A left-most one of the displayed plurality of content elements may comprise an advertisement content element.

The processing unit may also be operative to receive a second input indicating a selection of a one of the displayed plurality of content elements. In response to the received second input, the processing unit may be operative to remove the displayed full version of the programming content, remove the displayed plurality of content elements, display a shrunken version of the full version of the programming content, and display a more detailed version of the selected one of the plurality of content elements. Furthermore, the processing unit may be operative to receive a third input and, in response to the received third input, remove the more detailed version of the selected one of the plurality of content elements, remove the displayed shrunken version of the full version of the programming content, and redisplay the full version of the programming content. Moreover, the processing unit may be operative to, in response to user initiation, add a new content element to the plurality of content elements or to remove another one of the plurality of content elements from the plurality of content elements.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
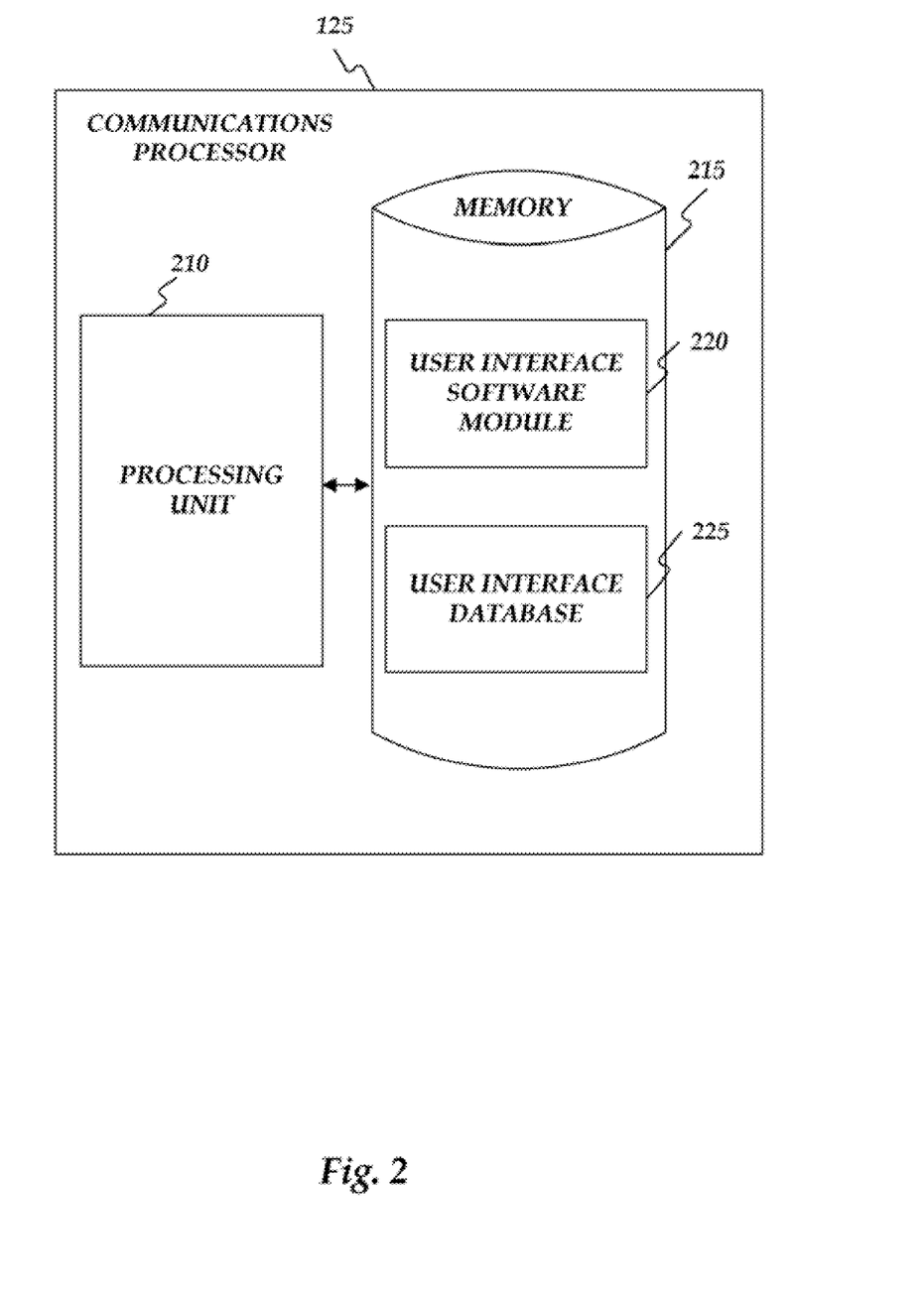
FIG. 2 is a block diagram of the communications processor.

FIG. 2 shows communications processor 125 of FIG. 1 in more detail. As shown in FIG. 2, communications processor 125 may include a processing unit 210 and a memory unit 215. Memory 215 may include a communication software module 220 and a communication database 225. While executing on processing unit 210, communication software module 220 may perform processes for providing a user interface, including, for example, one or more stages included in method 300 described below with respect to FIG. 3. Furthermore, any of communication software module 220 and communication database 225 may be executed on or reside in any element shown in FIG. 1.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
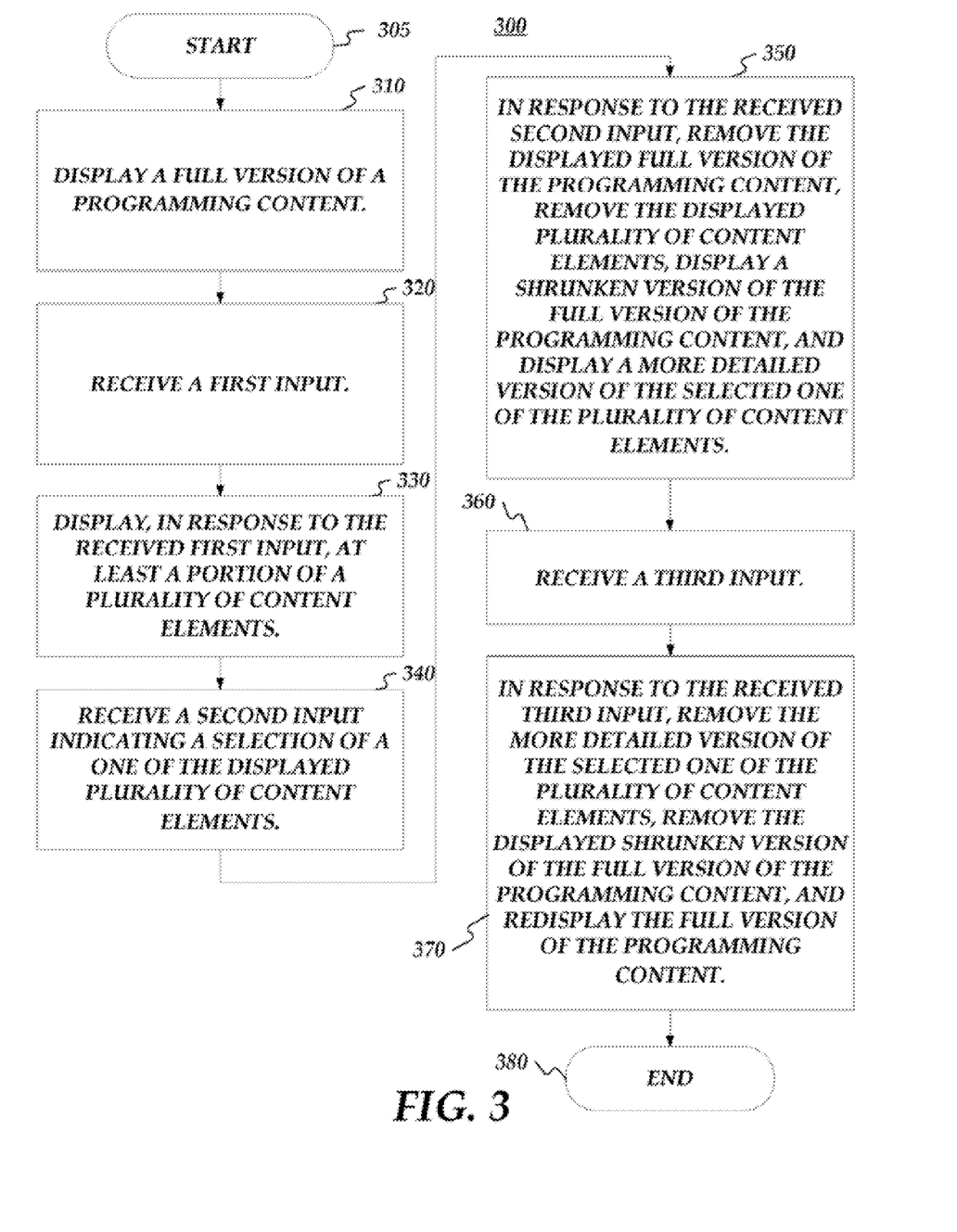
FIG. 3 is a flow chart of a method for providing a user interface.
Figure 4:
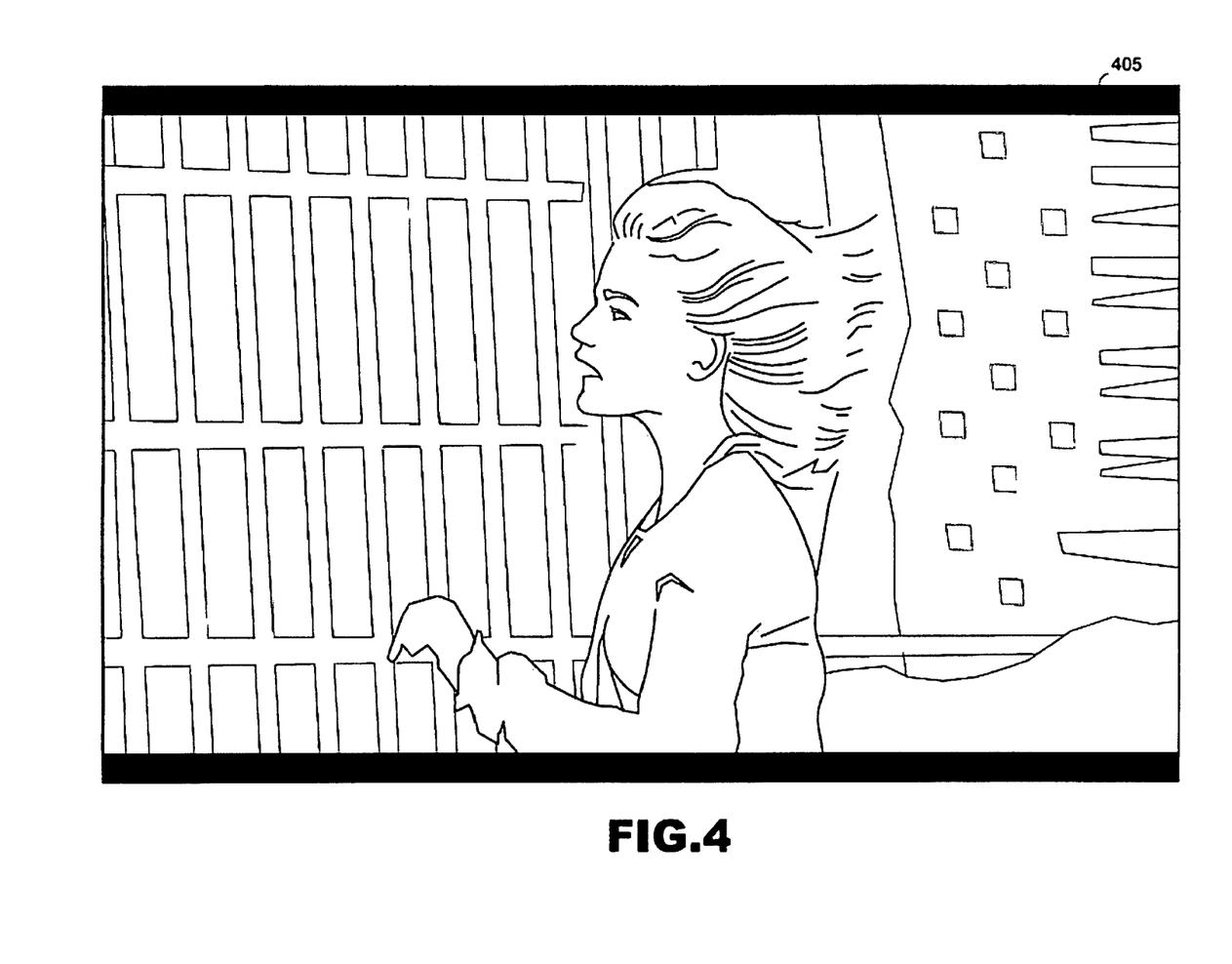
FIG. 4 is a diagram illustrating a full version of a programming content.

FIG. 3 is a flowchart setting forth the general stages involved in a method 300 consistent with embodiments of the invention for providing a user interface. Method 300 may be implemented using communications processor 125, as described above with respect to FIG. 2. Ways to implement the stages of method 300 will be described in greater detail below. Method 300 may begin at starting block 305 and proceed to stage 310 where communications processor 125 may display a full version 405 of a programming content as shown in FIG. 4. For example, a user may be watching programming content on TV 155, PC 170, or portable device 165 provided by a service provider. For example, the user may be, but is not limited to, a subscriber to HFC network 145. For example, the user may have a subscription with a service provider (e.g. such as a cable television service provider) to use all or a portion of system 100. The user, using TV 155, PC 170, or portable device 165 for example, may watch or otherwise consume content (e.g. full version 405) provided by the service provider. The service provider may control or otherwise operate communications processor 125 and HFC network 145. Furthermore, full version 405 of the programming content may be configured to fit at least the width of a high-definition television (HDTV) display.

From stage 310, where communications processor 125 displays full version 405 of the programming content, method 300 may advance to stage 320 where communications processor 125 may receive a first input. For example, the user, using STB 150, STB control device 175, PC 170, or portable device 165 for example, may initiate the first input that is then transmitted to communications processor 125 over system 100. For example, the user may press an "up arrow" on STB control device 175.

Figure 5:
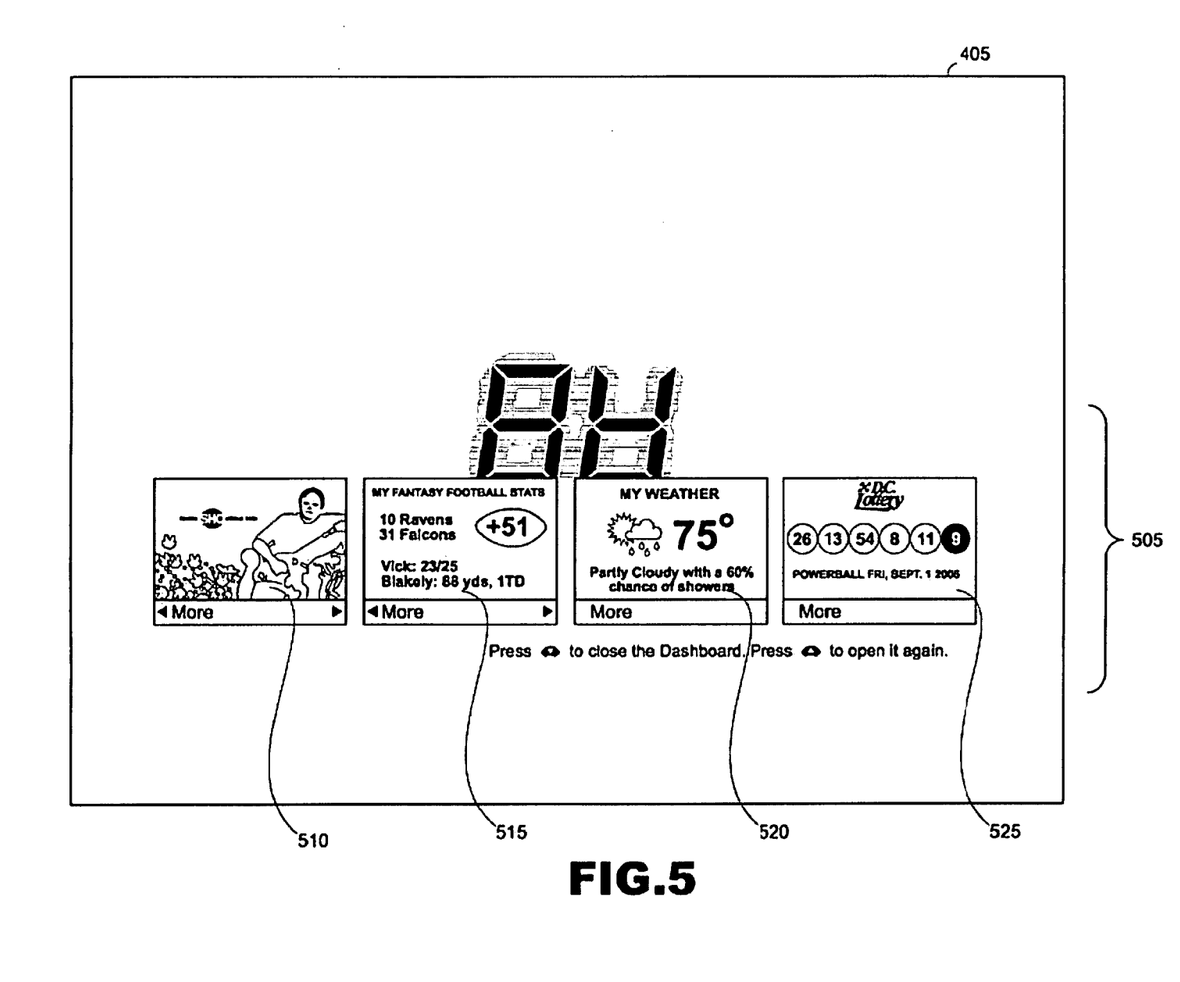
FIG. 5 is a diagram illustrating a portion of a plurality of content elements overlaid onto a full version of a programming content.

Once communications processor 125 receives the first input in stage 320, method 300 may continue to stage 330 where communications processor 125 may display, in response to the received first input, at least a portion of a plurality of content elements 505 as shown in FIG. 5. Consistent with embodiments of the invention, there may be more content elements than are displayed. For example, in response to the received first input, communications processor 125 may transmit data to TV 155, PC 170, STB 150, STB control device 175, or portable device 165 that may be displayed on TV 155, PC 170, or portable device 165 in the form of plurality of content elements 505. Plurality of content elements 505 may be displayed by overlaying plurality of content elements 505 onto full version 405 of the programming content.

Plurality of content elements 505 may include a first content element 510, a second content element 515, a third content element 520, and a fourth content element 525. As described in more detailed below, ones of the plurality of content elements 505 may comprise different element types such as, but not limited to, sports types, weather types, and lottery types. The user may select the different element types. For example, the user may have determined that second content element 515 is a sports content element, that third content element 520 is a weather content element, and that fourth content element 525 is a lottery content element. In this way too, the user may decide which place various content element type occupy.

While FIG. 5 shows content elements 505 as containing four content elements, content elements 505 may comprise any number of content elements. As shown in FIG. 5, plurality of content elements 505 may be displayed in a lower one-half of a display device (e.g. TV 155, PC 170, or portable device 165) where none of the displayed plurality of content elements abuts an edged of the display device.

First content element 510, second content element 515, third content element 520, and fourth content element 525 may be arranged, but not limited to, in a side-by-side manner as show in FIG. 5. Furthermore, one of displayed plurality of content elements 505 may comprise an advertisement content element. When plurality of content elements 505 are displayed in a left-to-right (e.g. side-by-side) manner as described above, a left-most one of displayed plurality of content elements 505 may comprise an advertisement content element. For example, first content element 510 may comprise an advertisement content element.

Figure 6:
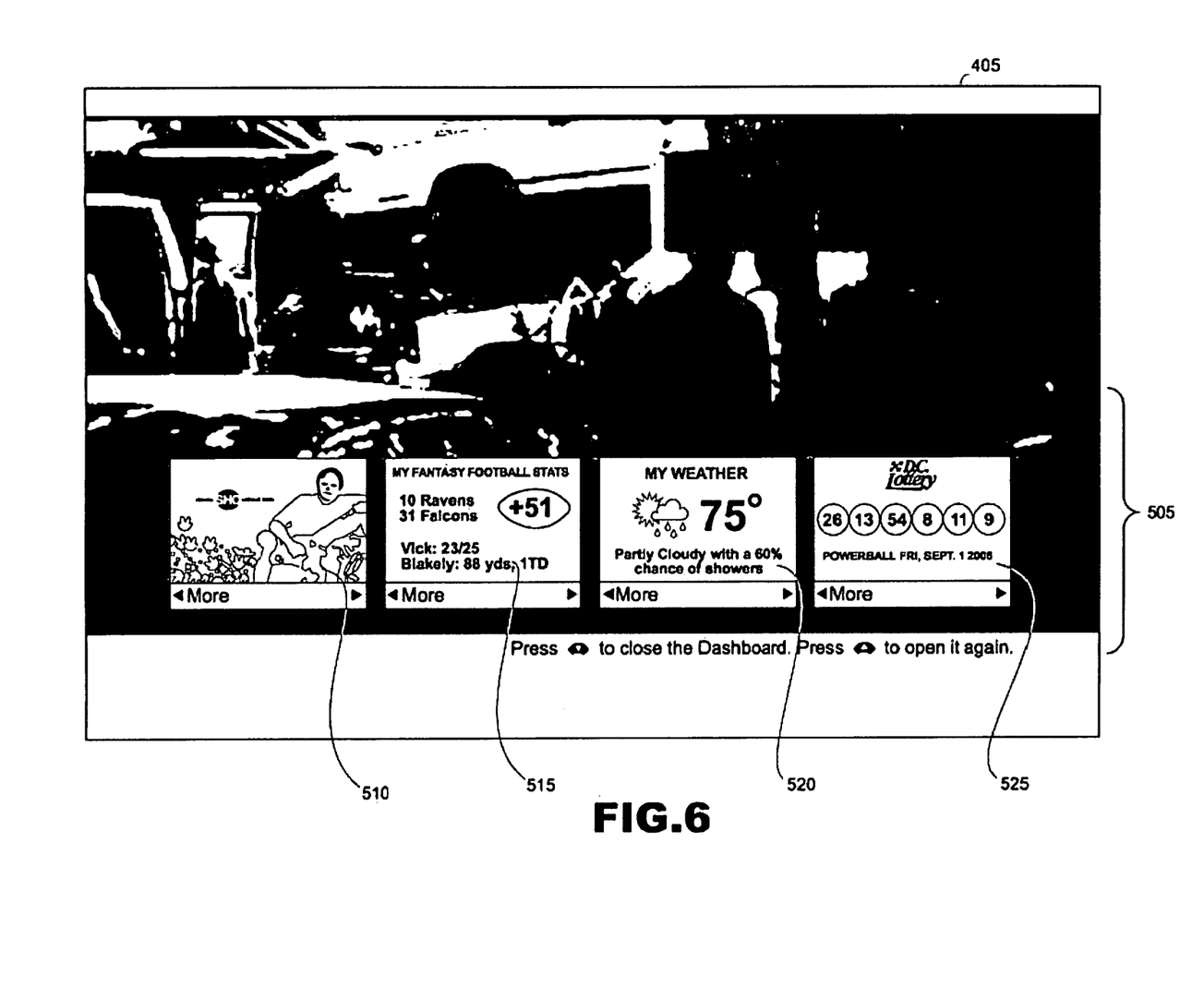
FIG. 6 is a diagram illustrating a selected content element.

After communications processor 125 displays the portion of plurality of content elements 505 in stage 330, method 300 may proceed to stage 340 where communications processor 125 may receive a second input indicating a selection of a one of displayed plurality of content elements 505. For example, when plurality of content elements 505 are displayed, one of the plurality of content elements 505 may be displayed in a selected manner. The user, for example, may press a left or right arrow key on TV 155, PC 170, STB 150, STB control device 175, or portable device 165 to scroll through plurality of content elements 505. With each press of the arrow key (e.g. left or right) a currently selected content element may be unelected and a next content element may be selected. For example, as shown in FIG. 5, content element 510 may be selected as indicated by lighter shading of a bottom portion of content element 510. The user may press the right arrow button on STB control device 175 to unelected content element 510 and to select content element 515 as shown in FIG. 6. Now that the user has selected content element 515, the user may then press an enter button on STB control device 175 to transmit the second input to communications processor 125 over system 100 indicating the selection of selected content element 515.

Consistent with embodiments of the invention, the user may press the right arrow key until content element 525 is selected. If the user presses the right arrow key again, the content elements my scroll to the left. For example, second content element 515 may take the place of first content element 510, third content element 520 may take the place of second content element 515, fourth content element 525 may take the place of third content element 520, and a new content element may take the place of fourth content element 525. This scrolling effect may be repeated if the user presses the right arrow key again or may be reversed if the left arrow key is pressed four times. The aforementioned scrolling effect is an example and other scrolling effects may be used.

Furthermore, one of displayed plurality of content elements 505 may remain static while others of the plurality of content elements are scrolled through. For example, the user may press the right arrow key until content element 525 is selected. If the user presses the right arrow key again, the content elements my scroll to the left. For example, first content element may remain in the left-most position, second content element 515 may disappear, third content element 520 may take the place of second content element 515, fourth content element 525 may take the place of third content element 520, and a new content element may take the place of fourth content element 525. This scrolling effect may be repeated if the user presses the right arrow key again or may be reversed if the left arrow key is pressed three times. In this embodiment, first content element may comprise an advertisement that the service provider wants to remain before (e.g. static) the user during any scrolling process.

Figure 7:
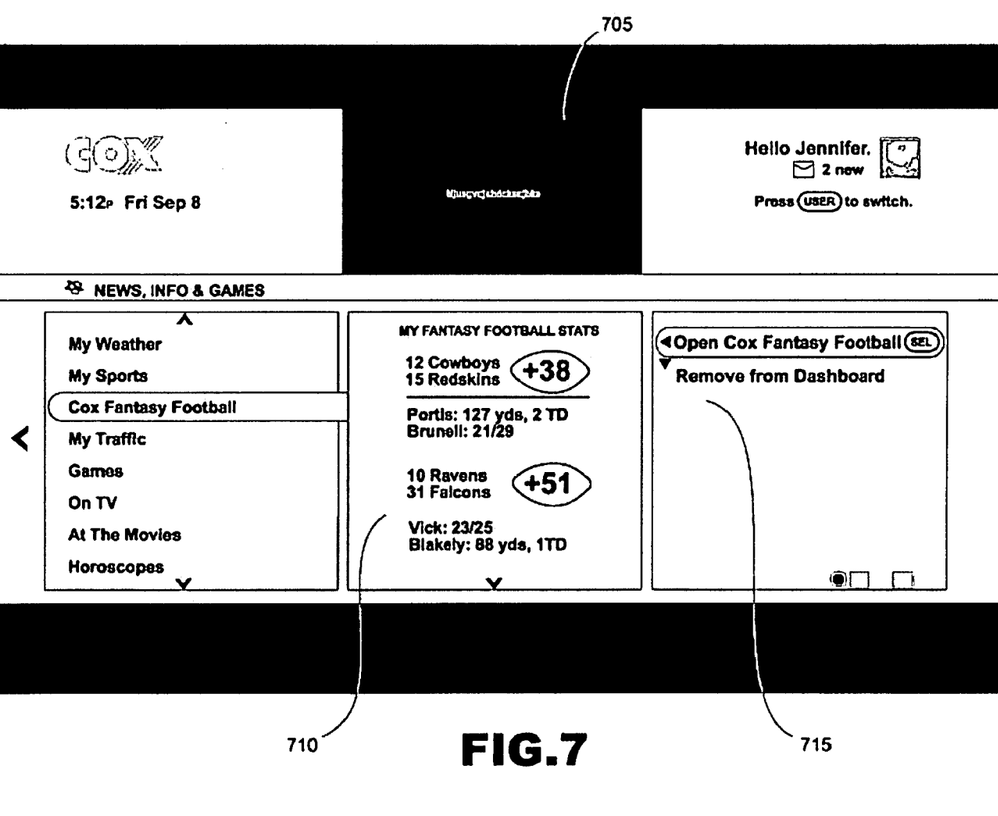
FIG. 7 is a diagram illustrating a shrunken version of a full version of a programming content.

From stage 340, where communications processor 125 receives the second input, method 300 may advance to stage 350 where communications processor 125 may respond to the received second input. For example, in response to the second input, TV 155, PC 170, STB 150, communications processor 125, portable device 165, or any combination thereof may, as shown in FIG. 7: i) remove displayed full version 405 of the programming content and displayed plurality of content elements 505; and ii) display a shrunken version 705 of full version 405 of the programming content; and iii) display a more detailed version 710 of the selected one of the plurality of content elements (e.g. second content element 515.) When shrunken version 705 of full version 405 of the programming content is displayed, the audio associated with full version 405 may continue to play.

As illustrated by FIG. 6 and FIG. 7, ones of content elements 505 may comprise synopsis of their more detailed versions (e.g. more detailed versions 710.) For example, the user may be watching full version 405 of the programming content on TV 155 and may become concerned about the weather. The user may have known it was 75 degrees early that day. The user may cause content elements 505 to be displayed on TV 155 in the manner described above. From third content element 520, the user may have noticed that it is now 60 degrees, a large temperature drop from earlier that day. Consequently, the user may select third content element 520 corresponding to the weather to get more details about the current conditions or even a forecast. A similar sequence may transpire for any content type and is not limited to weather.

Once communications processor 125 responds to the received second input in stage 350, method 300 may continue to stage 360 where communications processor 125 may receive a third input. For example, once the user has gathered any desired information from more detailed version 710, the user may press a button on STB control device 175 to transmit the third input to communications processor 125 over system 100. After communications processor 125 receives the third input in stage 360, method 300 may proceed to stage 370 where communications processor 125 may respond to the third input. For example, in response to the third input, TV 155, PC 170, STB 150, communications processor 125, portable device 165, or any combination thereof may: i) remove more detailed version 710 of the selected one of the plurality of content elements 505; ii) remove displayed shrunken version 705 of full version 405 of the programming content; and iii) redisplay full version 405 of the programming content. For example, TV 155, PC 170, or portable device 165 may return to displaying in a manner similar to the example of FIG. 4. After communications processor 125 responds to the third input in stage 370, method 300 may then end at stage 380.

Figure 8:
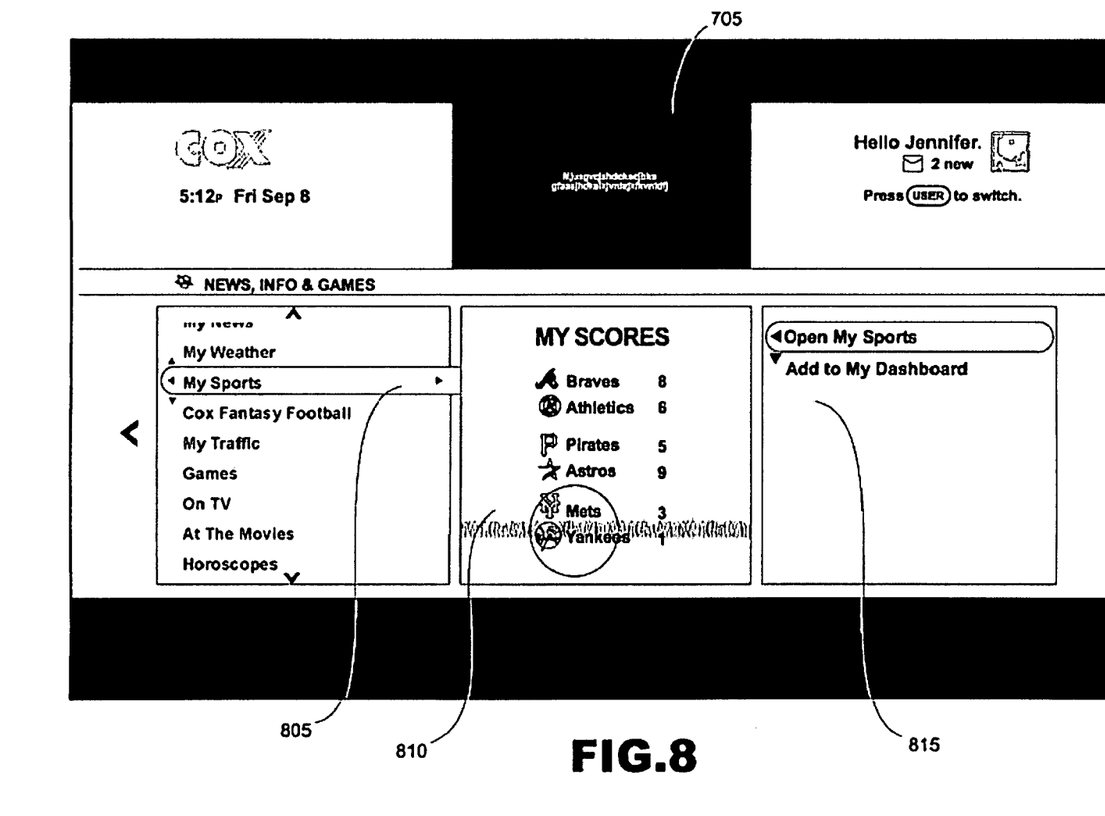
FIG. 8 shows adding a content element to a plurality of content elements.

Embodiments of the invention may allow the user to add different content elements to plurality of content elements 505 or may allow the user to remove content elements from plurality of content elements 505. For example, as shown in FIG. 7, the user may select button 715 if the user wanted to remove content element 515 from plurality of content elements 505. Furthermore, in an edit mode, the user may bring up the display shown in FIG. 8. The user may wish to create a "my sports" content element to be included in plurality of content elements 505. Accordingly, the user may select "my sports" button 805, customize a more detailed "my sports" content element in area 810, and select "add to my dashboard" button 815 to cause this newly created content element to be include in plurality of content elements 505.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:
1. A method for providing a user interface, the method comprising:
　displaying a full version of a programming content;
　receiving a first input;
　displaying, in response to the received first input, a plurality of content elements, the plurality of content elements overlaying a portion of the full version of a programming content, each of the plurality of content elements including a synopsis relating to a particular content element wherein displaying the plurality of content elements comprises overlaying the displayed plurality of content elements onto the full version of the programming content, the displayed plurality of content elements being displayed in a lower one-half of a display device and wherein none of the displayed plurality of content elements abuts an edge of the display device wherein the plurality of content elements comprising the following content types: sports, weather, and lottery;
receiving a second input indicating a selection of a one of the displayed plurality of content elements;
in response to the received second input,
displaying a shrunken version of the full version of the programming content, and
displaying a detailed version of the selected one of the plurality of content elements;
receiving a third input; and
in response to the received third input,
removing the detailed version of the selected one of the plurality of content elements,
removing the displayed shrunken version of the full version of the programming content, and
displaying the full version of the programming content.

2. The method of claim 1, wherein displaying the full version of the programming content comprises displaying the full version of the programming content to fit at least the width of the display device comprising a high-definition television (HDTV) display.

3. The method of claim 1, wherein displaying the plurality of content elements comprises displaying the plurality of content elements in a side-by-side manner.

4. The method of claim 1, wherein displaying the plurality of content elements comprises scrolling through the plurality of content elements in response to user input to display the plurality of content elements wherein an order through which the plurality of content elements are scrolled is user determined.

5. The method of claim 1, wherein removing the displayed full version of the programming content comprises continuing playing audio corresponding to the programming content when the shrunken version of the full version of the programming content is displayed.

6. The method of claim 1, further comprising, in response to user initiation, adding a new content element to the plurality of content elements.

7. The method of claim 1, further comprising, in response to user initiation, removing another one of the plurality of content elements from the plurality of content elements.

8. The method of claim 1, wherein displaying the plurality of content elements comprises displaying an advertisement content element comprises wherein advertisement is provided by a service provider.

9. The method of claim 1, wherein displaying the detailed version comprises displaying an edit content element, wherein the edit content element is displayed to the right of the detailed version.

10. The method of claim 9, further comprising:
receiving a fourth input from the user to edit the selected one of the plurality of content elements; and
editing the selected one of the plurality of content elements.

11. The method of claim 9, further comprising:
receiving a fourth input from the user to customize the selected one of the plurality of content elements; and
customizing the selected one of the plurality of content elements.

12. A method for providing a user interface, the method comprising:
displaying a full version of a programming content;
receiving a first input;
displaying, in response to the received first input, a plurality of content elements, the plurality of content elements overlaying a portion of the full version of a programming content, each of the plurality of content elements including a synopsis relating to a particular content element wherein displaying the plurality of content elements comprises;
overlaying the displayed plurality of content elements onto the full version of the programming content, the displayed plurality of content elements being displayed in a lower one-half of a display device and wherein none of the displayed plurality of content elements abuts an edge of the display device,
displaying the plurality of content elements in a side-by-side manner, and
scrolling through the plurality of content elements in response to user input to display the plurality of content elements wherein an order through which the plurality of content elements are scrolled is user determined;
receiving a second input indicating a selection of a one of the displayed plurality of content elements;
in response to the received second input,
displaying a shrunken version of the full version of the programming content, and
displaying a detailed version of the selected one of the plurality of content elements;
receiving a third input; and
in response to the received third input,
removing the detailed version of the selected one of the plurality of content elements,
removing the displayed shrunken version of the full version of the programming content, and
displaying the full version of the programming content.

13. The method of claim 12, wherein displaying a plurality of content elements comprises displaying the plurality of content elements comprising at least one of the following content types: sports, weather, and lottery.

14. The method of claim 12, wherein removing the displayed full version of the programming content comprises continuing playing audio corresponding to the programming content when the shrunken version of the full version of the programming content is displayed.

15. The method of claim 12, further comprising, in response to user initiation, adding a new content element to the plurality of content elements.

16. The method of claim 12, further comprising, in response to user initiation, removing another one of the plurality of content elements from the plurality of content elements.

17. The method of claim 12, wherein displaying the plurality of content elements comprises displaying an advertisement content element comprises wherein advertisement is provided by a service provider.

18. The method of claim 12, wherein displaying the detailed version comprises displaying an edit content element, wherein the edit content element is displayed to the right of the detailed version.

19. The method of claim 18, further comprising:
receiving a fourth input from the user to edit the selected one of the plurality of content elements; and
editing the selected one of the plurality of content elements.

20. A system for providing a user interface, the system comprising:
a memory storage; and
a processing unit coupled to the memory storage, wherein the processing unit is operative to:
displaying a full version of a programming content;
receiving a first input;

displaying, in response to the received first input, a plurality of content elements, the plurality of content elements overlaying a portion of the full version of a programming content, each of the plurality of content elements including a synopsis relating to a particular content element wherein displaying the plurality of content elements comprises overlaying the displayed plurality of content elements onto the full version of the programming content, the displayed plurality of content elements being displayed in a lower one-half of a display device and wherein none of the displayed plurality of content elements abuts an edge of the display device wherein the plurality of content elements comprising the following content types: sports, weather, and lottery;

receiving a second input indicating a selection of a one of the displayed plurality of content elements;

in response to the received second input,
    displaying a shrunken version of the full version of the programming content, and
    displaying a detailed version of the selected one of the plurality of content elements;

receiving a third input; and in response to the received third input,
    removing the detailed version of the selected one of the plurality of content elements,
    removing the displayed shrunken version of the full version of the programming content, and
    displaying the full version of the programming content.

\* \* \* \* \*